US008828619B2

(12) United States Patent
Lee et al.

(10) Patent No.: US 8,828,619 B2
(45) Date of Patent: Sep. 9, 2014

(54) PROTON EXCHANGE POLYMER MEMBRANE USING SURFACE TREATMENT TECHNIQUE BASED ON DIRECT FLUORINATION, MEMBRANE-ELECTRODE ASSEMBLY, AND FUEL CELL COMPRISING THE SAME

(75) Inventors: Young-Moo Lee, Seoul (KR);
Chang-Hyun Lee, Seoul (KR);
Sang-Yun Lee, Daejeon (KR)

(73) Assignee: Industry-University Cooperation Foundation, Hanyang University, Seoul (KR)

( * ) Notice: Subject to any disclaimer, the term of this patent is extended or adjusted under 35 U.S.C. 154(b) by 345 days.

(21) Appl. No.: 12/863,594

(22) PCT Filed: Feb. 13, 2008

(86) PCT No.: PCT/KR2008/000850
§ 371 (c)(1),
(2), (4) Date: Jul. 20, 2010

(87) PCT Pub. No.: WO2009/069854
PCT Pub. Date: Jun. 4, 2009

(65) Prior Publication Data
US 2011/0014544 A1    Jan. 20, 2011

(30) Foreign Application Priority Data

Nov. 27, 2007  (KR) .................. 10-2007-0121371
Feb. 1, 2008  (KR) .................. 10-2008-0010565

(51) Int. Cl.
*H01M 8/10*   (2006.01)
(52) U.S. Cl.
USPC ........................................... 429/492

(58) Field of Classification Search
CPC ....................................... H01M 8/1088
USPC ............................................ 429/492
See application file for complete search history.

(56) References Cited

U.S. PATENT DOCUMENTS 7,183,017 B2   2/2007 Taft, III et al.
7,214,740 B2   5/2007 Lochhaas et al.
(Continued)

FOREIGN PATENT DOCUMENTS

CN    1739216 A    2/2006
CN    1849345 A    10/2006
(Continued)

OTHER PUBLICATIONS

Ho-Young Jung et al., The effect of sulfonated poly(ether ether ketone) as an electrode binder for direct methanol fuel cell (DMFC), Journal of Power Sources 163 (2006), 56-59.
(Continued)

*Primary Examiner* — Alison Hindenlang
(74) *Attorney, Agent, or Firm* — Lexyoume IP Meister, PLLC

(57) ABSTRACT

A proton exchange polymer membrane whose surface is treated by direct fluorination using a fluorine gas, a membrane-electrode assembly, and a fuel cell comprising the same are provided. The proton exchange polymer membrane of the present invention exhibits improved proton conductivity, high dimensional stability, and decreased methanol permeability through introducing hydrophobic fluorine having high electronegativity to the surface of the polymer membrane. Therefore, the proton exchange polymer membrane with excellent electrochemical properties of the present invention can be preferably utilized as polymer electrolyte membrane for fuel cell, generating electric energy from chemical energy of fuels.

13 Claims, 5 Drawing Sheets

(56) References Cited

U.S. PATENT DOCUMENTS

| | | | |
|---|---|---|---|
| 2005/0244697 A1 | 11/2005 | Taft, III | |
| 2006/0252888 A1* | 11/2006 | Lochhaas et al. | 525/326.2 |
| 2007/0218334 A1 | 9/2007 | Bonorand | |

FOREIGN PATENT DOCUMENTS

| | | |
|---|---|---|
| EP | 1596453 | 11/2005 |
| EP | 1666508 | 6/2006 |
| JP | 19145005 | 6/2007 |
| WO | 2007126222 | 11/2007 |

OTHER PUBLICATIONS

Kyung A Sung et al., Influence of dispersion solvent for catalyst ink containing sulfonated poly(ether ether ketone) on cathode behaviour in a direct methanol fuel cell, Journal of Power Sources 169 (2007), 271-275.

Jeong-Hi Kim et al., Dependence of the performance of a high-temperature polymer electtrolyte fuel cell on phosphoric acid-doped polybenzimidazole ionomer content in cathode catalyst layer, Journal of Power Sources 170 (2007), 275-280.

Dae Sik Kim et al., Synthesis of highly fluorinated poly(arylene ether)s copolymers for proton exchange membrane materials, Journal of Membrane Science 281 (2006), 111-120.

K.B.Wiles et al., Directly copolymerized partially fluorinated disulfonated poly(arylene ether sulfone) random copolymers for PEM fuel cell systems: Synthesis, fabrication and characterization of membranes and membrane-electrode assemblies for fuel cell applications, Journal of Membrane Science 294 (2007), 22-29.

M. Sankir et al., Proton exchange membrane for DMFC and H2/air fuel cells: Synthesis and characterization of partially fluorinated disulfonated poly(arylene ether benzonitrile) copolymers, Journal of Membrane Science 299 (2007) ,8-18.

A. Tressaud et al., Modification of surface properties of carbon-based and polymeric materials through fluorination routes: Form fundamental research to industrial applications, Journal of Fluorine Chemistry 128 (2007), 378-391.

Yu Seung Kim et al., Direct Methanol Fuel Cell Performance of Disulfonated Ply(arylene ether benzonitrile) copolymers, J. Electrochem. Soc. 151 (2004), A2150-A2156.

Ho-Young Jung et al., Sulfonated poly(arylene ether sulfone) as an electrode binder for direct methanol fuel cell, Electrochinica Acta 52 (2007), 4916-4921.

Myung Heui Woo et al, Zirconium phosphate sulfonated poly (fluorinated arylene ether)s composite membranes for PEMFCs at 100-140 C, Electrochimica Acta 51 (2006), 6051-6059.

Heung Chang Lee et al., Preparation and evaluation of sulfonated-fluorinated poly (arylene ether)s membranes for a proton exchange membrane fuel cell (PEMFC), Electrochimica Acta 49 (2004), 2315-2323.

Yan Gao et al., Low-swelling proton-conducting copoly(aryl ether nitrile)s containing naphthalene structure with sulfonic acid groups meta to the ether lingkage, Polymer 47 (2006), 808-816.

Xuezhong Jiang et al., Sequestration of electroactive materials in a high Tg, insulating polymer matrix for optoelectronic applications. Part 1. Light emitting diode devices, Polymer 47 (2006), 4123-4139.

European Patent Office, Supplementary European Search Report, Nov. 29, 2011.

A.P.Kharitonov, Practical applications of the direct fluorination of polymers, Institute of Energy Problems of Chemical Physics (Division), Russian Academy of Sciences, Chemogolovka, Moscow Region, Russia NL, vol. 103, No. 2, Apr. 1, 2000.

A.P.Kharitonov, Direct Fluorination-Useful tool to enhance commercial properties of polymer articles, Journal of Fluorine Chemistry Elsevier, NL, vol. 126, No. 2, Feb. 1, 2005, pp. 251-263.

* cited by examiner

PROTON EXCHANGE POLYMER MEMBRANE USING SURFACE TREATMENT TECHNIQUE BASED ON DIRECT FLUORINATION, MEMBRANE-ELECTRODE ASSEMBLY, AND FUEL CELL COMPRISING THE SAME

TECHNICAL FIELD

The present invention relates to a proton exchange polymer membrane whose surface is treated based on direct fluorination using fluorine gas, a membrane-electrode assembly, and a fuel cell comprising the same.

BACKGROUND ART

A proton exchange polymer membrane fuel cell (PEMFC) and a direct methanol fuel cell (DMFC) based on a proton conductive polymer electrolyte membrane are energy generation systems having high energy efficiency and a low emission of air polluting substances. Particularly, unlike petroleum which is limited recoverable reserves, these fuel cells are advantageous in that the use of hydrogen or methanol as a fuel is almost perpetual. Thus, the fuel cells have been studied with great interest as an alternative energy source.

FIG. 1 is a basic schematic view of a membrane-electrode assembly (MEA) constituting a fuel cell for producing electric energy and water/heat.

With reference to FIG. 1, A proton conductive polymer electrolyte membrane 1 generates protons, as in the following reaction, through a catalytic reaction of hydrogen/methanol 4 provided to an anode with an anode catalyst 9.

(In the case of PEMFC)

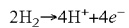

$2H_2 \rightarrow 4H^+ + 4e^-$ (In the case of DMFC)

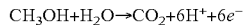

$CH_3OH + H_2O \rightarrow CO_2 + 6H^+ + 6e^-$

Thusly formed protons move to a cathode via the proton conductive polymer electrolyte membrane such as a proton transport 7. And, electrons moved through an external circuit 12 and air or oxygen 5 provided to the cathode meets to produce water, electric energy and heat 6 by a reduction reaction as in the following reaction.

(In the case of PEMFC)

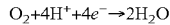

$O_2 + 4H^+ + 4e^- \rightarrow 2H_2O$ (In the case of DMFC)

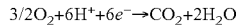

$3/2 O_2 + 6H^+ + 6e^- \rightarrow CO_2 + 2H_2O$

At this time, the electrode portion where redox reaction occurs has a structure in which metal nanoparticles such as platinum (Pt) and ruthenium (Ru) 9 or 10 are deposited on graphites 11 to form a catalytic particle mass, and the catalytic particle mass is mixed with a catalyst binder 8, which is a proton conductive polymer substance. The electrochemical performance is deeply related to formation of a suitable triple phase boundary within the electrolyte, electrode, and fuel.

In general, as a catalyst binder for preparing an electrode, a Nafion binder (EW=1,100) dispersed in a mixed solution of isopropyl alcohol and water is used due to its high proton conductivity and chemical stability.

Unlike using the Nafion membrane as a polymer electrolyte membrane, when using a hydrocarbon polymer such as sulfonated polysulfone, poly(arylene ether sulfone), poly(arylene ether ketone), polyimides, or polyphosphazene, which is currently preferred as a substitute for the polymer electrolyte membrane, there is a big difference in the compatibility with Nafion as a catalyst binder. Thus it has high interfacial resistance between the polymer electrolyte membrane and the catalyst layers and forms inappropriate triple phase boundary, thereby the polymer membrane has low electrochemical unit cell performance. In addition, by repeating the humid/dry condition according to the operation of the fuel cell, delamination of the electrode layers from the electrolyte membrane in MEA is occurred, and as a result, the fuel cell performance is rapidly deteriorated. Therefore, in order to resolve these serious interfacial problems, several attempts have been conducted.

For example, attempts to reduce interfacial resistance between a polymer electrolyte membrane and catalyst electrodes using the same polymeric material for the membrane and electrodes are introduced in *Journal of Power Sources* 163 (2006) 56-59, *Electrochinica Acta* 52 (2007) 4916-4921, *Journal of Power Sources* 169 (2007) 271-275, *Journal of Power Sources* 170 (2007) 275-280, and the like. However, despite the improvement in the adhesiveness between the electrolyte membrane and the catalyst layer, these attempts are still restricted in their use, because of the problems such as limits to dissolution of the polymer used as a catalyst binder, significantly reduced catalytic activity due to inappropriate solvent selection, low electrochemical unit cell performance in spite of high proton conductivity, and low chemical/electrochemical stability.

There also have been attempts to introduce fluorine groups to a sulfonated polymer electrolyte membrane to improve interfacial characteristics (*J. Electrochem. Soc.* 151 (2004) A2150-A2156; *Electrochim. Acta* 49 (2004) 2315-2323; *Journal of Membrane Science* 281 (2006) 111-120, *Polymer* 47 (2006) 808-816; *Electrochimica Acta* 51 (2006) 6051-6059, *Polymer* 47 (2006) 4123-4139; *Journal of Membrane Science* 294 (2007) 22-29; *Journal of Membrane Science* 299 (2007) 8-18).

Generally, a method for preparing a hydrocarbon polymer by a condensation reaction using partial-fluorinated monomers is used. However, in this case, there is a problem that the condensation reaction is interfered with the high electronegativity of fluorine, and as a result, it has a limitation of obtaining hydrocarbon polymer having a high molecular weight. In addition to the molecular weight reduction problem, there are problems of degradation of the polymer chains and difficulty in controlling a degree of sulfonation through a post-sulfonation process (*Electrochimica Acta* 49 (2004) 2315-2323).

To this point, several examples for substituting fluorine groups to the polymer by direct fluorination (Orfanofluorine Chemistry: Principles and Commercial Applications, Plenum Press, New York, 1994, p. 469, Journal of Fluorine Chemistry 128 (2007) 378-391) have been mentioned. However, there have yet been attempts to conduct direct fluorination on a proton conductive polymer electrolyte membrane for fuel cell.

Korean Patent Laid-open Publication No. 2007-98325 discloses a method for fluorinating a hydrophobic region of a proton conductive block copolymer not including sulfonic acid groups by swelling in a hydrocarbon solvent (C1-based solvent) and subjecting to a Friedel-Craft reaction using a fluorinating agent which dissolves in the same solvent. As a result, surface modification in the hydrophobic region of a grafted structure containing a fluoro-compound is exhibited. In this case, a catalyst such as $SnCl_4$, $FeCl_3$, or $AlCl_3$ must be used to facilitate the reaction.

However, the fluorination method according to above-mentioned patent has problems that additional costs for using a solvent, treatment after the use of the solvent and a catalyst are generated. Moreover, since the fluorination is carried out in the hydrophobic region of the polymer, there are barely any effects on the spontaneous dissociation of the sulfonic acid groups adjacent to the fluorine groups due to high electronegativity of the fluorinated polymer. As a result, the fluorination has barely any influence on improvement in the proton conductivity of the polymer membrane. Furthermore, there are problems that a great amount of time is required in drying after swelling and reacting the polymer in the solvent and the fluorination process becomes more complicated.

DISCLOSURE OF INVENTION

Technical Problem

Therefore, the present invention has been made in view of the above problems, and it is an object of the present invention to provide a proton exchange polymer membrane with excellent electrochemical properties whose surface is treated by direct fluorination using a fluorine gas having high reactivity.

It is an object of the present invention to provide a membrane-electrode assembly and a fuel cell comprising the above-mentioned proton exchange membrane.

Technical Solution

In accordance with an aspect of the present invention, the above and other objects can be accomplished by the provision of a proton exchange polymer membrane whose surface is treated by a direct surface fluorination using a fluorine gas.

In accordance with another aspect of the present invention, there is provided a membrane-electrode assembly (MEA) including a proton exchange polymer membrane comprising:

an anode and a cathode positioned opposite from each other; and a polymer electrolyte membrane disposed between the two electrodes, wherein, the polymer electrolyte membrane is surface treated by direct fluorination using a fluorine gas.

In accordance with yet another aspect of the present invention, there is provided a fuel cell including a membrane-electrode assembly (MEA) including a proton exchange polymer membrane whose surface is treated by direct surface fluorination using fluorine gas.

Advantageous Effects

The proton exchange polymer membrane of the present invention exhibits improved proton conductivity, high dimensional stability, and decreased methanol permeability through introducing hydrophobic fluorine having high electronegativity to the surface of the polymer membrane. Therefore, the proton exchange polymer membrane with excellent electrochemical properties of the present invention can be preferably utilized as polymer electrolyte membrane for fuel cell, generating electric energy from chemical energy of fuels.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

The present invention will be described in greater detail below.

The present invention is directed to a proton exchange polymer membrane whose surface is treated by direct fluorination.

In detail, the polymer electrolyte membrane of the present invention is prepared by surface treatment technique which directly substitutes hydrogen groups with fluorine groups in the aromatic and aliphatic chain of the polymer that constitutes the readily prepared hydrocarbon polymer membrane using fluorine gas having high activity.

The proton exchange polymer membrane is fluorinated such that a degree of surface-fluorination is 1 to 90% with respect to carbon atoms when, in general, quantitatively analyzed within 100 nanometers from the interface of the polymer membrane based on a surface analysis system such as x-ray photoelectron microscopy (XPS).

When the degree of surface-fluorination is less than the above-mentioned range, the efficiency of the polymer membrane is very low. On the contrary, when the degree exceeds its maximum condition, the physical properties of the polymer membrane may be damaged or generate undesired side reactions, and at the same time, the treatment is not economical.

Figure 1:
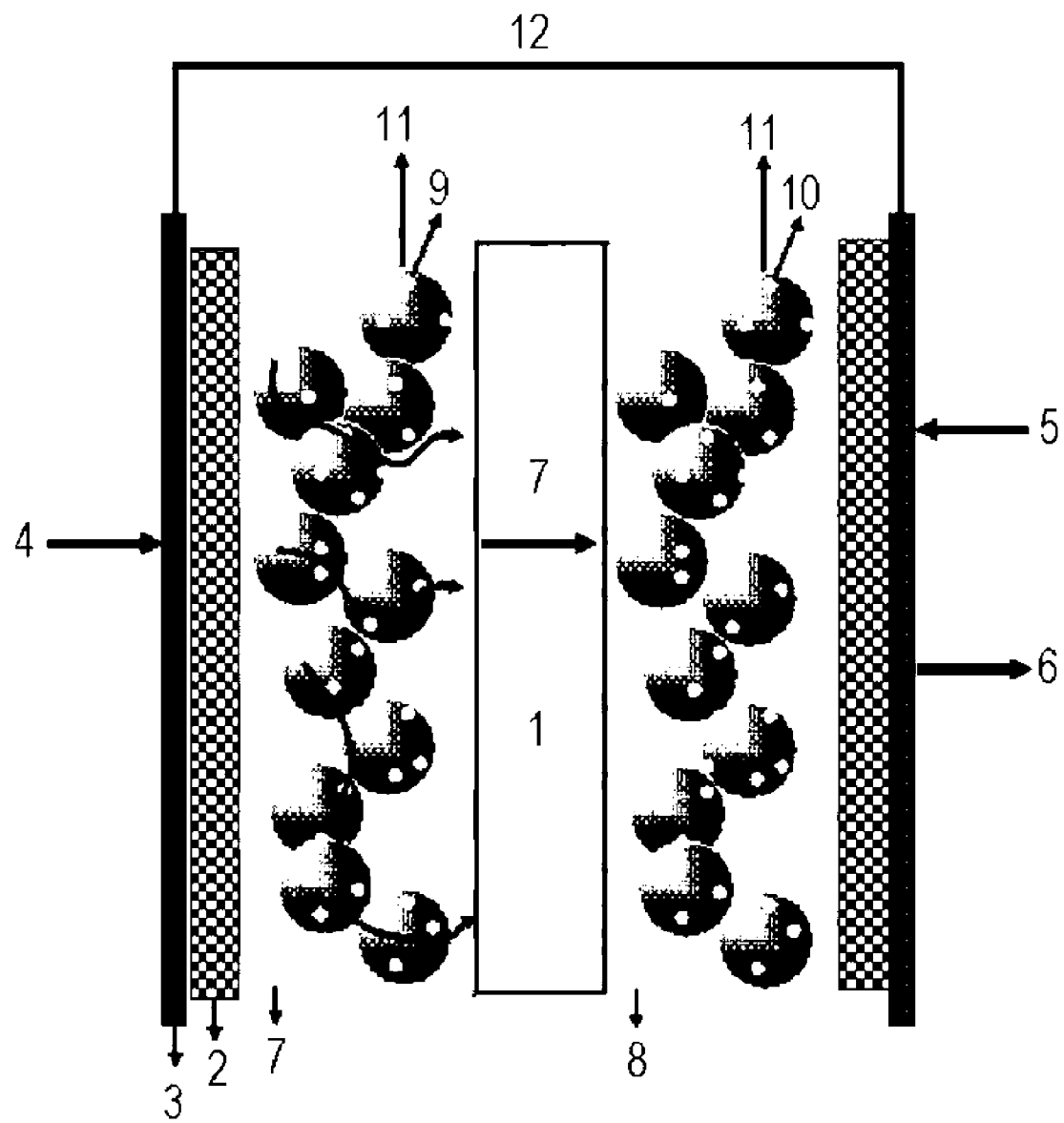
FIG. 1 is a schematic assembly of a fuel cell that generates electric energy and water simultaneously.
Figure 2:
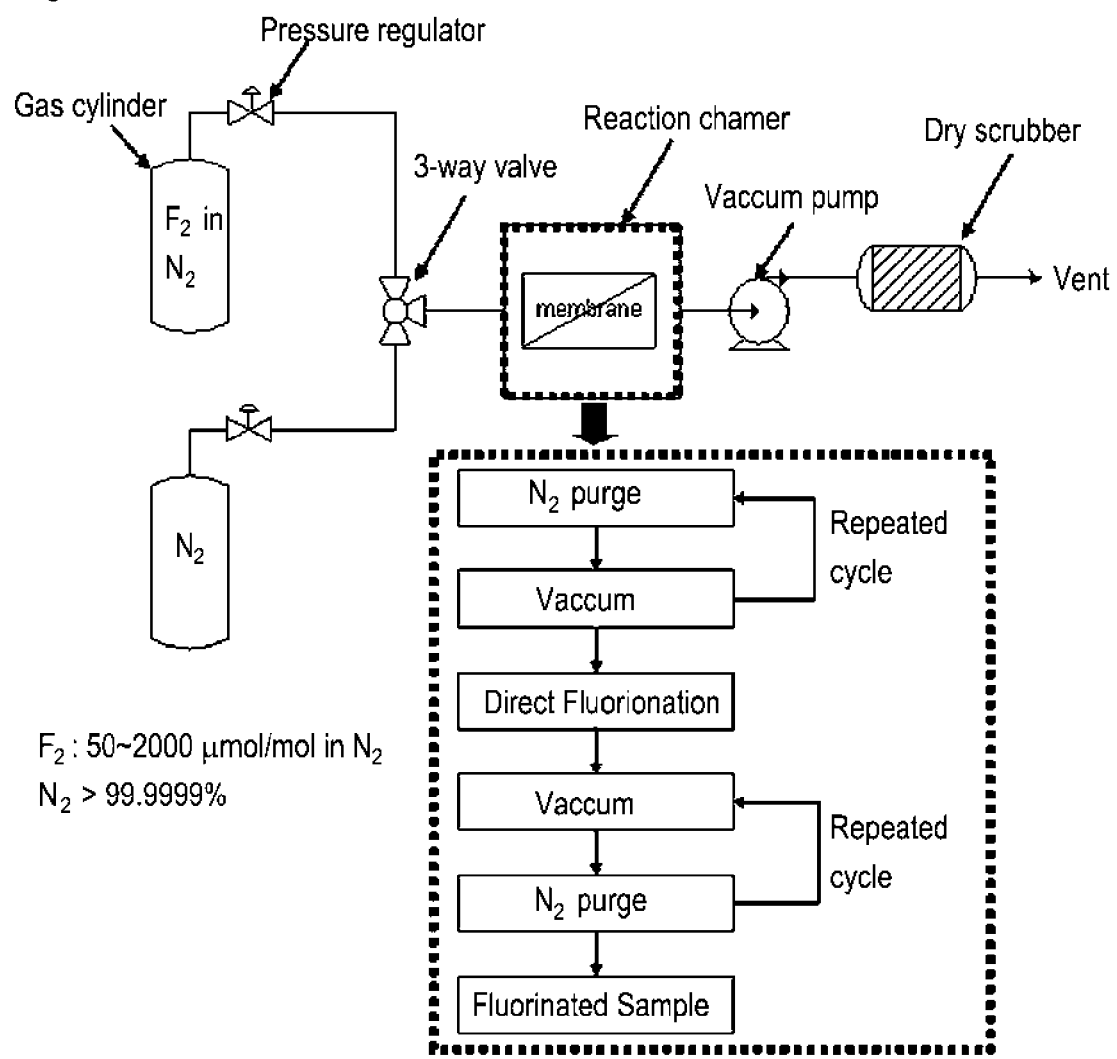
FIG. 2 is a schematic view showing a method for surface treating a proton exchange polymer membrane by direct fluorination of the present invention.

FIG. 2 illustrates a method for surface treating a proton exchange polymer membrane by direct fluorination according to an embodiment of the present invention.

The method for treating the surface of a proton exchange polymer membrane by direct fluorination disclosed in FIG. 2 will be described below.

First, a dried polymer electrolyte membrane is inserted into a chamber where a fluorination reaction occurs, and fixed thereto. Then nitrogen gas is purged into the chamber and vacuumed out. By repeating this process, unknown chemical substances that may reside in the chamber are removed.

The membrane materials of the present invention can be all conventional polymer materials. Typical examples thereof may include, but are not limited to, polyimide, polysulfone, poly(arylene ether sulfone), poly(arylene ether ketone), poly(arylene sulfone sulfone), polybenzimidazole, polybenzoxazole, polybenzthiazole, poly(ether ether ketone) or polyphosphazene, an organic-inorganic composite polymer containing an inorganic filler, an organic-inorganic nanocomposite polymer, or the like. In addition, it is more preferable that the polymer membrane further comprises a hydrophilic functional group such as a sulfonic acid group, a carboxyl group, or a phosphoric acid group that can quickly transport protons by spontaneous dissociation of protons in a hydration state.

Meanwhile, when applying the electrolyte membrane prepared only with pure polymer to a fuel cell, there may be limits in durability, proton conductivity, and fuel permeability. Therefore, a proton conductive polymer electrolyte having a high performance is in demand. To solve this problem, various types of inorganic fillers are required to prepare an organic-inorganic composite. In this case, the polymer electrolyte further comprises inorganic fillers selected from the group consisting of inorganic oxides such as $TiO_2$, $SiO_2$, $Al_2O_3$, $ZrO_2$, $MnO_2$, MgO, CuO, tetraethoxysilane (TEOS), montmorillonite or mordenite; or heteropolyacids such as zirconium phosphate (ZrP), phosphotungstic acid, silicotungstic acid, phosphomolybdic acid, and silicomolybdic acid.

Thereafter, since the membrane may be damaged when fluorine gas is directly purged into the chamber, an inert gas, i.e., nitrogen gas was purged and mixed with the fluorine gas via a 3-way valve to minimize the damage. Then, the flat sheet membrane sample was fluorinated in the reactor at ambient temperature and pressure, while inflowing the $F_2$ gas of a predetermined concentration, for a predetermined time.

The degree of fluorination may vary depending on a fluorine dilute gas. As a result, the dilute gas needs to be carefully selected. Typically, it is preferable that nitrogen, argon, or helium is used as a dilute gas.

To terminate the direct fluorination reaction, the fluorine-nitrogen-mixed gas was vacuumed out using a vacuum pump. Then, a nitrogen gas treatment and vacuum process was repeated to remove residual reactive gases.

As factors for determining a degree of fluorination that are controlled by direct fluorination of the present invention, there are concentration of $F_2$ gas, surface treatment temperature, surface treatment time, surface treatment pressure.

The surface is preferably treated using fluorine gas of a concentration of 20 ppm to 1000 ppm. And the surface is preferably treated during ranging of 30 seconds to 24 hours, at a temperature of −50° C. to 250° C. In addition, the surface is preferably treated at a pressure ranging of 0.1 atm to 50 atm.

When the surface treatment is carried out in the conditions less than the minimum conditions of the above-listed fluorine gas concentration, surface treatment time, surface treatment temperature and surface treatment pressure, the degree of surface-fluorination of the polymer membrane is too low to exhibit its efficiency on direct fluorination. On the contrary, when the conditions exceeds the maximum conditions, the physical properties of the polymer membrane may be damaged or generate undesired side reactions, and at the same time, the treatment is not economical.

The method for fluorination of the present invention has been described with reference to a method illustrated in FIG. 2. However, FIG. 2 describes an example of a method for preparation of fluorinated proton exchange polymer membrane by direct fluorination of the present invention for illustrative purposes. Thus, the fluorination method of the present invention will not be limited to the method illustrated in FIG. 2.

When the above-described proton exchange polymer membrane of the present invention is surface-fluorinated by direct fluorination, effects thereof are as in the following:

1. Reduction in Water Uptake of Polymer Electrolyte

There is an effect of reducing the water uptake in the polymer electrolyte membrane through introducing hydrophobic fluorine groups to the surface of the polymer membrane.

2. Increase in Dimensional Stability of Polymer Electrolyte

Due to decrease in the water uptake, a dimensional stability, specifically in the surface direction of the electrolyte membrane is improved. Thus, when a fuel cell is repeatedly operated and stopped, contraction and expansion of the electrolyte membrane in the MEA is repeated. Thereby, the delamination phenomenon between the electrolyte membrane and catalyst layers caused by this repetition can be reduced.

3. Increase in Proton Conductivity of Polymer Electrolyte

Due to high electronegativity of the substituted fluorine, the electron density of sulfonic acid groups surrounding carbon atoms adjacent to the fluorine groups is reduced. The reduction in the electron density facilitates spontaneous dissociation of the sulfonic acid groups under a fuel cell operation condition of a humid condition and increases acidity of the electrolyte. Thereby, the polymer electrolyte has improved proton conductivity.

4. Decrease in Methanol Permeability of Polymer Electrolyte in Application to DMFC Due to decrease in the water uptake in the polymer electrolyte membrane, a content of methanol that passes through the electrolyte membrane in a form of a mixture with water per unit time is decreased. Thus, poisoning of a cathode catalyst is delayed, to thereby improve initial and long term operation of the MEA.

5. Reduction in Interfacial Resistance with Catalyst Layer when Preparing MEA

Increase in the compatibility with a Nafion binder used in preparing an MEA based on a hydrocarbon proton conductive polymer electrolyte membrane causes the reduction of the interfacial resistance between the electrolyte membrane and the catalyst electrodes.

6. Increase in Electrochemically Initial Unit Cell Performance in Preparing MEA

In application to PEMFC, the initial unit cell performance is increased due to improvement in the proton conductivity of the polymer electrolyte membrane and reduction in the interfacial resistance between the polymer membrane and catalyst layers in the MEA. In addition to the above effects, the initial unit cell performance is improved by the reduction of the methanol permeability even in DMFC applications.

7. Increase in Long Term Operation Characteristics in Preparing MEA

Reduction in the delamination phenomenon based on high adhesiveness between the electrolyte membrane and catalyst layers has positive effects on electrochemical long term operation characteristics. Especially, in the case of DMFC, preparation of a preferable MEA capable of maintaining its high long term operation performance in addition to reducing the methanol permeability is possible.

Moreover, the surface-fluorinated proton exchange polymer membrane by direct fluorination of the present invention may be utilized in various purposes such as for fuel cells, for electrolysis, for hydrous or anhydrous electrodialysis and diffusion dialysis, for pervaporation, gas separation, dialysis, ultrafiltration, nanofiltraion or a reverse osmosis process. Especially, the polymer membrane is useful in preparation of MEA for fuel cells and in preparation of fuel cells comprising such MEA.

Particularly, the polymer electrolyte membrane is preferably applicable to an MEA for a fuel cell comprising an anode and a cathode positioned opposite from each other, and a polymer electrolyte membrane disposed between the two electrodes, in which the surface of the polymer electrolyte membrane is treated by direct fluorination using fluorine gas.

The MEA can be preferably used as a main part of a proton exchange polymer membrane fuel cell (PEMFC) and a direct methanol fuel cell (DMFC) among many fuel cells.

As seen from the above, the fluorine-substituted polymer membrane of the present invention has an improved proton conductivity through facilitation of a spontaneous dissociation of sulfonic acid and an increase in the acidity of an electrolyte under a fuel cell operating condition of a humid condition since an electron density of the sulfonic acid groups surrounding carbon atoms adjacent to fluorine groups is decreased due to a high electronegativity of fluorine.

In addition, the fluorine-substituted polymer membrane of the present invention has increased dimensional stability of the membrane by reducing the high degree of swelling of the membrane due to the hydrophobicity of the substituted fluorine group.

Also, the polymer membrane of the present invention reduces methanol permeability through relatively reduced water uptake when the membrane is used for a direct methanol fuel cell. In addition, the polymer membrane of the present invention reduces an interfacial resistance between the electrodes and the electrolyte membrane through improving compatibility with a Nafion catalyst binder, to thereby improve initial and long term electrochemical operation characteristics of the prepared membrane-electrode assembly (MEA).

MODE FOR THE INVENTION

Now, the present invention will be described in more detail with reference to the following Examples. These examples are provided only for illustrating the present invention and should not be construed as limiting the scope and spirit of the present invention.

Example 1

A surface of the sulfonated poly(arylene ether sulfone) membrane having a chemical structure in the following Formula 1 was fluorinated by dry direct fluorination process based on the order illustrated in FIG. 2 using a fluorination reactor shown in FIG. 2. Specifically, a dried polymer electrolyte membrane is inserted into a fluorination reaction chamber, and the membrane is fixed thereto. Nitrogen gas was purged into the chamber, and then vacuumed out. By repeating this process, chemical substances that may reside in the chamber were removed. Thereafter, since the membrane may be damaged when fluorine gas is directly purged into the chamber, an inert gas, i.e., nitrogen gas was purged and mixed with the fluorine gas via a 3-way valve to minimize the damage. Then, the flat sheet membrane sample was fluorinated in the reactor at ambient temperature and pressure (25° C. and 1 atm), while inflowing the $F_2$ gas of 50 ppm, for 5 minutes. To terminate the direct fluorination reaction, the fluorine-nitrogen-mix gas was vacuumed out using a vacuum pump. Then, a nitrogen gas treatment and vacuum process was repeated to remove residual reactive gases.

Example 2

A surface-fluorinated sulfonated poly(arylene ether sulfone) membrane was prepared in the same manner as in Example 1, except that the fluorination time was 10 minutes.

Example 3

A surface-fluorinated sulfonated poly(arylene ether sulfone) membrane was prepared in the same manner as in Example 1, except that the fluorination time was 30 minutes.

Example 4

A surface-fluorinated sulfonated poly(arylene ether sulfone) membrane was prepared in the same manner as in Example 1, except that the fluorination time was 1 hour.

Example 5

A surface-fluorinated sulfonated poly(arylene ether sulfone) membrane was prepared in the same manner as in Example 1, except that the fluorination time was 5 hours.

Example 6

A surface-fluorinated sulfonated poly(arylene ether sulfone) membrane was prepared in the same manner as in Example 1, except that the $F_2$ concentration was 1,000 ppm.

Example 7

A surface-fluorinated sulfonated poly(arylene ether sulfone) membrane was prepared in the same manner as in Example 1, except that the reaction temperature was 60° C.

Example 8

A surface-fluorinated sulfonated poly(arylene ether sulfone) membrane was prepared in the same manner as in Example 1, except that the reaction pressure was 10 atm.

Example 9

A surface-fluorinated sulfonated poly(arylene ether sulfone) membrane was prepared in the same manner as in Example 1, except that helium was used as a dilute gas of the fluorine gas.

Example 10

A surface-fluorinated sulfonated poly(arylene ether sulfone) membrane was prepared in the same manner as in

[Formula 1]

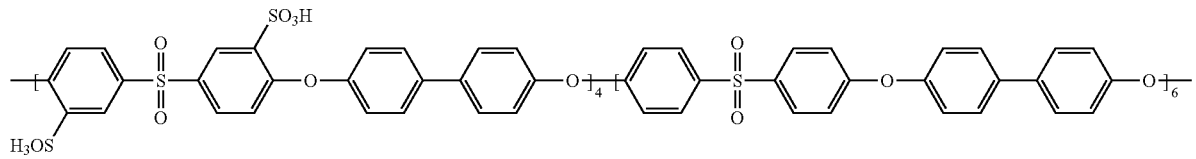

Example 1, except that an organic-inorganic nanocomposite membrane containing 1 wt % of Aerosil 380 hydrophilic fumed silica particles based on the polymer weight was used.

Example 11

A surface-fluorinated sulfonated poly(arylene ether sulfone)-Al$_2$O$_3$ nanocomposite membrane was prepared in the same manner as in Example 1, except that an organic-inorganic nanocomposite membrane containing 1 wt % of Al$_2$O$_3$ nanoparticles based on the polymer weight was used.

Example 12

A surface-fluorinated sulfonated poly(arylene ether sulfone)-MgO nanocomposite membrane was prepared in the same manner as in Example 1, except that an organic-inorganic nanocomposite membrane containing 1 wt % of MgO nanoparticles based on the polymer weight was used.

Example 13

A surface-fluorinated sulfonated poly(arylene ether sulfone)-ZrP nanocomposite membrane was prepared in the same manner as in Example 1, except that an organic-inorganic nanocomposite membrane containing 1 wt % of ZrP nanoparticles based on the polymer weight was used.

Example 13

A surface-fluorinated sulfonated polyimide membrane was prepared in the same manner as in Example 1, except that a sulfonated polyimide membrane having a chemical structure in the following Formula 2 was used.

[Formula 2]

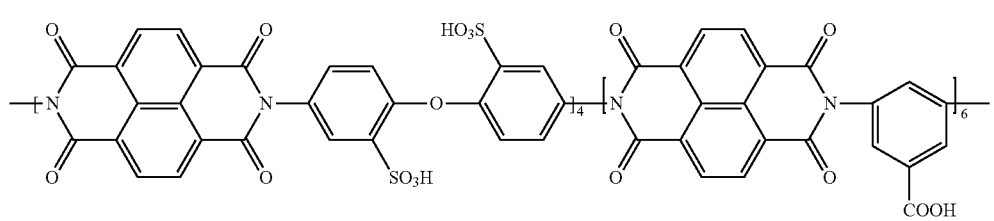

Example 15

A surface-fluorinated sulfonated poly(arylene ether ketone) membrane was prepared in the same manner as in Example 1, except that a sulfonated poly(arylene ether ketone) membrane having a chemical structure as the following Formula 3 was used.

[Formula 3]

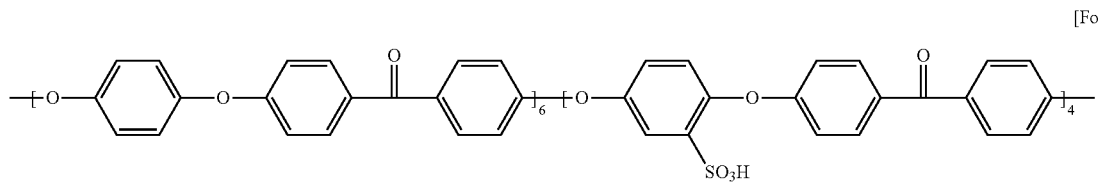

Example 16

A surface-fluorinated sulfonated poly(arylene sulfone sulfone) membrane was prepared in the same manner as in Example 1, except that a sulfonated poly(arylene sulfone sulfone) membrane having a chemical structure in the following Formula 4 was used.

[Formula 4]

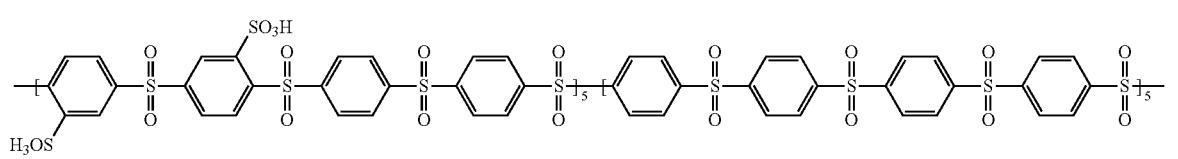

Comparative Example 1

A sulfonated poly(arylene ether sulfone) membrane was prepared in the same manner as in Example 1, except that a surface treatment technique using direct fluorination was not applied.

Comparative Example 2

A sulfonated polyimide membrane was prepared in the same manner as in Example 13, except that a surface treatment technique using direct fluorination was not applied.

Comparative Example 3

A sulfonated poly(arylene ether ketone) membrane was prepared in the same manner as in Example 14, except that a surface treatment technique using direct fluorination was not applied.

Comparative Example 4

A sulfonated poly(arylene sulfone sulfone) membrane was prepared in the same manner as in Example 15, except that a surface treatment technique using direct fluorination was not applied.

Experimental Example

1. XPS Analysis

To confirm surface-fluorination on the sulfonated polymer electrolyte membranes prepared in Example 1 and Comparative Example 1, spectra were obtained by XPS method.

Figure 3:
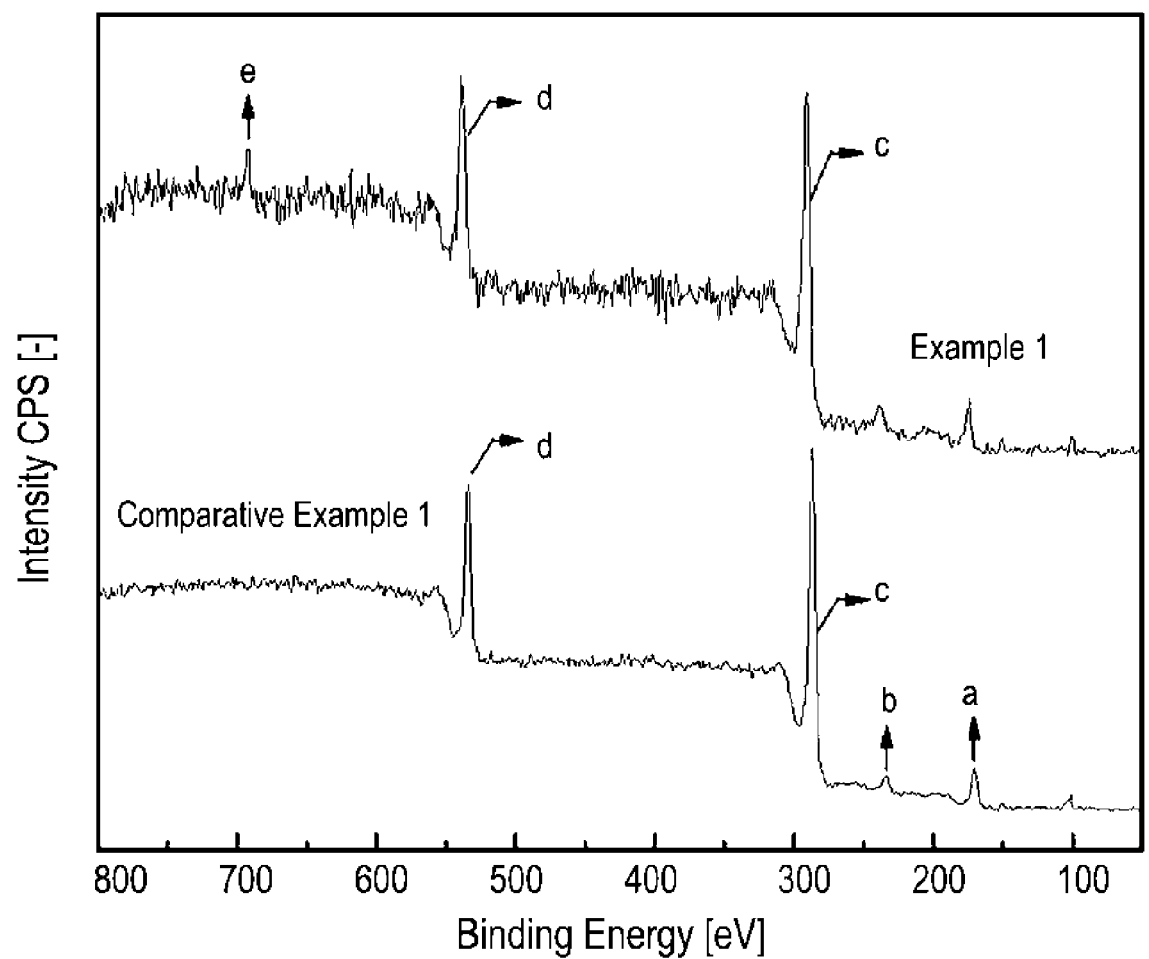
FIG. 3 exhibits XPS survey spectra of proton exchange membranes obtained in Example 1 and Comparative Example 1.

FIG. 3 is XPS survey spectra of the proton exchange membranes prepared in Example 1 and Comparative Example 1.

Referring to FIG. 3, the sulfonated poly(arylene ether sulfone) membrane of Comparative Example 1 is composed of constituent elements such as a. S2p, b. S2s, c. C1s, and d. O1s. On the other hand, the surface-fluorinated sulfonated poly(arylene ether sulfone) membrane of Example 1 showed an additional peak at e. F1s in addition to the constituent elements of Comparative Example 1. Thus, it can be confirmed that the surface-fluorination was conducted. Furthermore, the surface treatment by the direct fluorination is generally conducted to have a fluorinated surface thickness of 0.01 to 1 micrometer. However, a quantitative analysis of a degree of fluorination of Example 1, measured in view that the measuring range of XPS is 1 to 100 nanometer (Journal of Fluorine Chemistry 128 (2007) 378-391), showed that the fluorine content was about 5% with respect to the resulting carbon atoms.

2. Water Uptake

The water uptake of sulfonated polymer electrolyte membranes prepared in Examples 1 to 16 and Comparative Examples 1 to 4 was measured.

The water uptake of each prepared membrane was measured by (Membranous Weight after Swelling−Membranous Weight before Swelling)/(Membranous Weight before Swelling)×100 after swelling the membrane for one day in ultra pure water at 25° C.

Table 1 shows the measurement results of water uptake.

TABLE 1

| | Water uptake (%) | | |
|---|---|---|---|
| Classification | Membranous Weight before Swelling (g) | Membranous Weight after Swelling (g) | Water uptake (%) |
| Example 1 | 1.0523 | 1.2964 | 23.2 |
| Example 2 | 1.6329 | 1.9823 | 21.4 |
| Example 3 | 1.3937 | 1.6627 | 19.3 |
| Example 4 | 1.0906 | 1.2880 | 18.1 |
| Example 5 | 1.2386 | 1.4591 | 17.8 |
| Example 6 | 1.7729 | 2.1133 | 19.2 |
| Example 7 | 1.5286 | 1.8404 | 20.4 |
| Example 8 | 2.2881 | 2.7617 | 20.7 |
| Example 9 | 1.3234 | 1.6238 | 22.7 |
| Example 10 | 1.6872 | 2.0786 | 23.2 |
| Example 11 | 1.2883 | 1.5691 | 21.8 |
| Example 12 | 1.3456 | 1.6403 | 21.9 |
| Example 13 | 1.2321 | 1.5069 | 22.3 |
| Example 14 | 1.3751 | 1.7890 | 30.1 |
| Example 15 | 1.4298 | 1.8931 | 32.4 |
| Example 16 | 1.3219 | 1.8269 | 38.2 |
| Comparative Example 1 | 1.0783 | 1.3522 | 25.4 |
| Comparative Example 2 | 1.3938 | 1.8705 | 34.2 |
| Comparative Example 3 | 1.2981 | 1.7823 | 37.3 |
| Comparative Example 4 | 1.1392 | 1.6610 | 45.8 |

As can be seen in Table 1, the water uptake of the polymer electrolyte membranes of the present invention, which had been surface-fluorinated by the direct fluorination, was lower than the polymer membranes of Comparative Examples without the surface fluorination.

3. Dimensional Stability

The degree of swelling is determined by (Surface Area after Swelling−Surface Area before Swelling)/(Surface Area before Swelling)×100 after swelling the membrane for one day in ultra pure water at 25° C.

The membranes having a relatively low degree of swelling have higher dimensional stability. Thus, in the case of MEA based on such an electrolyte membrane, relatively low delamination with respect to a catalytic electrode can be expected.

Table 2 shows the measurement results of the degree of swelling of electrolyte membranes in the surface direction.

TABLE 2

Degree of Swelling of Electrolyte Membrane in the Surface Direction: Dimensional Stability (%)

| Classification | Surface Area before Swelling (cm$^2$) | Surface Area after Swelling (cm$^2$) | Degree of Swelling in the Surface Direction (%) |
|---|---|---|---|
| Example 1 | 5 | 7.01 | 40.1 |
| Example 2 | 5 | 6.82 | 36.4 |
| Example 3 | 5 | 6.64 | 32.7 |
| Example 4 | 5 | 6.42 | 28.3 |
| Example 5 | 5 | 6.35 | 26.9 |
| Example 6 | 5 | 6.79 | 35.8 |
| Example 7 | 5 | 6.86 | 37.2 |
| Example 8 | 5 | 6.77 | 35.3 |
| Example 9 | 5 | 6.91 | 38.2 |
| Example 10 | 5 | 5.92 | 18.3 |
| Example 11 | 5 | 5.86 | 17.2 |
| Example 12 | 5 | 5.89 | 17.7 |

TABLE 2-continued

Degree of Swelling of Electrolyte Membrane in the Surface Direction: Dimensional Stability (%)

| Classification | Surface Area before Swelling (cm$^2$) | Surface Area after Swelling (cm$^2$) | Degree of Swelling in the Surface Direction (%) |
|---|---|---|---|
| Example 13 | 5 | 6.23 | 24.6 |
| Example 14 | 5 | 6.32 | 26.4 |
| Example 15 | 5 | 7.02 | 40.4 |
| Example 16 | 5 | 7.19 | 43.8 |
| Comparative Example 1 | 5 | 7.12 | 42.3 |
| Comparative Example 2 | 5 | 6.47 | 29.4 |
| Comparative Example 3 | 5 | 7.37 | 47.3 |
| Comparative Example 4 | 5 | 7.61 | 52.1 |

As can be seen in Table 2, the degree of swelling of the electrolyte membranes in the surface direction, which had been surface-fluorinated by the direct fluorination, was also lower than the polymer membranes of Comparative Examples without the surface fluorination.

4. Proton Conductivity

The proton conductivity was obtained by measuring the ohmic resistance or bulk resistance using a four point probe AC impedance spectroscopic method, and then substituting the values in σ=1/(R×S). Here, σ(S/cm) is a proton conductivity, l (cm) is a distance between electrodes for measuring a voltage drop, R (Ω) is an ohmic resistance of the polymer electrolyte, and S (cm$^2$) is a surface area of an electrolyte where a predetermined current passes through.

The four point probe structure for measuring the proton conductivity is installed in a constant temperature and humidity chamber capable of controlling to a predetermined temperature and humidity, which is connected with an electrochemical interface (Solatron 1287, Solatron Analytical, Farnborough Hamshire, GU14, ONR, UK) and impedance spectroscopy (Solatron 1260). Nyquist and Bode plots were used to measure the ohmic resistance. The ohmic resistance is measured by measuring a voltage drop between two inner electrodes of the four point probe when a predetermined current (10 mA) is applied to two external electrodes of the four point probe through the polymer electrolyte.

Table 3 shows values measured using the measurement equipment and method in ultra pure water at 30° C.

TABLE 3

Proton Conductivity (S/cm)

| Classification | Proton Conductivity (*10$^{-2}$ S/cm) |
|---|---|
| Example 1 | 10.8 |
| Example 2 | 11.3 |
| Example 3 | 11.9 |
| Example 4 | 12.5 |
| Example 5 | 12.7 |
| Example 6 | 11.6 |
| Example 7 | 11.9 |
| Example 8 | 11.4 |
| Example 9 | 11.1 |
| Example 10 | 14.4 |
| Example 11 | 15.2 |
| Example 12 | 16.3 |
| Example 13 | 18.1 |
| Example 14 | 14.2 |
| Example 15 | 17.3 |
| Example 16 | 10.8 |
| Comparative Example 1 | 10.2 |
| Comparative Example 2 | 12.4 |
| Comparative Example 3 | 14.7 |
| Comparative Example 4 | 9.3 |

As can be seen in Table 3, the proton conductivity of the polymer electrolyte membrane improved after the surface-fluorination by the direct fluorination.

5. Methanol Permeability

Methanol permeability was measured by a two chamber diffusion cell method. Before the measurement, each polymer electrolyte membrane was swelled for over a day in ultra pure water at 30° C. Then, the swelled membrane was installed between two chambers. For the measurement, one chamber was filled with 10 M methanol solution, and the other chamber was filled with ultra pure water. After some period of time, methanol diffused into the chamber filled only with ultra pure water from the chamber filled with the methanol solution through the polymer electrolyte. At this time, the amount of diffused methanol was measured using gas chromatography (GC, Shimadtzu, GC-14B, Tokyo, Japan).

Table 4 shows the measurement results of the methanol permeability.

TABLE 4

Methanol Permeability (cm$^3$cm/cm$^2$sec)

| Classification | Methanol Permeability (*10$^{-7}$ cm$^3$cm/cm$^2$sec) |
|---|---|
| Example 1 | 4.28 |
| Example 2 | 2.19 |
| Example 3 | 1.21 |
| Example 4 | 0.96 |
| Example 5 | 0.82 |
| Example 6 | 1.57 |
| Example 7 | 1.76 |
| Example 8 | 1.67 |
| Example 9 | 3.37 |
| Example 10 | 0.86 |
| Example 11 | 0.73 |
| Example 12 | 0.78 |
| Example 13 | 1.28 |
| Example 14 | 5.21 |
| Example 15 | 4.82 |
| Example 16 | 2.35 |
| Comparative Example 1 | 6.64 |
| Comparative Example 2 | 10.23 |
| Comparative Example 3 | 9.33 |
| Comparative Example 4 | 5.58 |

Figure 4:
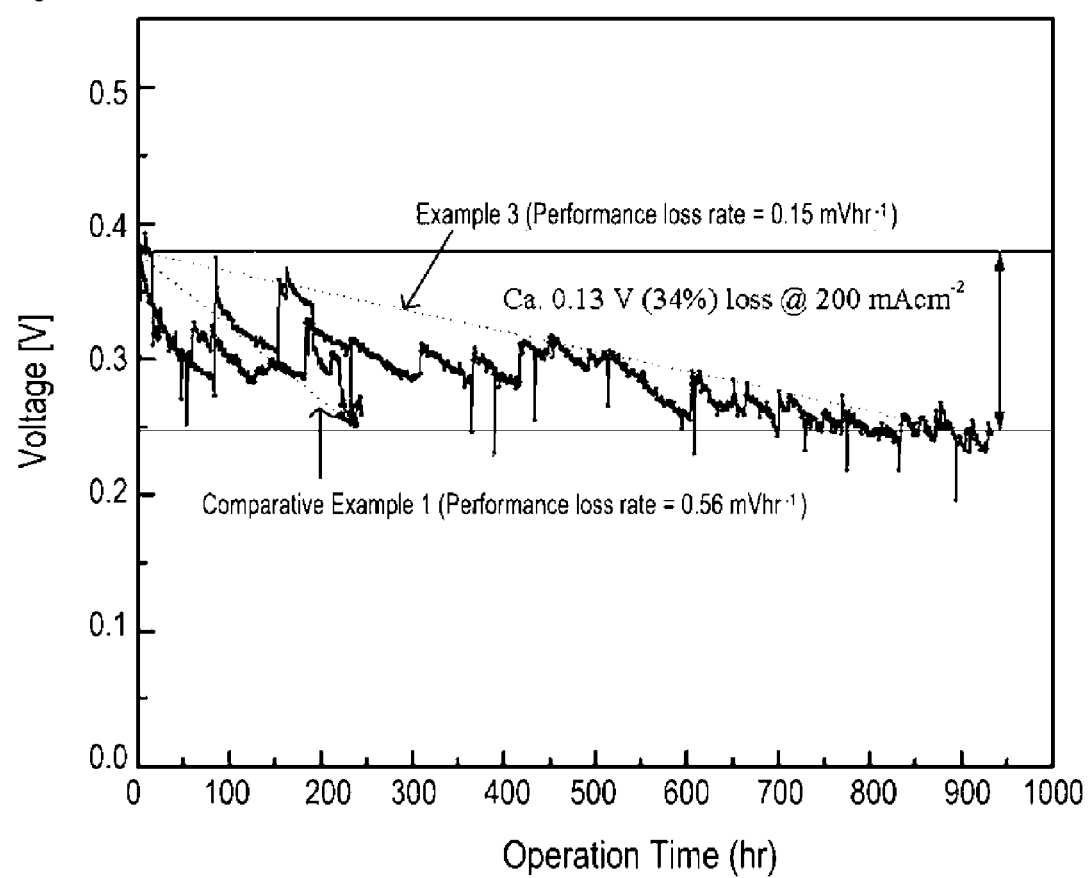
FIG. 4 is a graph showing a long term operation characteristic of an MEA using a proton exchange polymer membrane obtained in Example 3 and Comparative Example 1.

As can be seen in FIG. 4, the methanol permeability decreased in the case of the sulfonated polymer electrolyte membrane, which had been surface-fluorinated by the direct fluorination, since the membrane induces barrier property to methanol.

6. Interfacial Resistance

Interfacial resistance between the electrolyte membrane and catalytic electrode on the MEA based on the polymer electrolyte membrane was measured by a two point probe AC impedance spectroscopic method using an electrochemical interface (Solatron 1287), Solatron Analytical, Farnborough Hampshire, GU14, ONR, UK) and impedance spectroscopy (Solatron 1260) when driving a fuel cell. At this time, each prepared MEA has an active area of 5 cm². When preparing an MEA for PEMFC, an amount of catalyst support in MEA for both electrodes is Pt/C 0.3 mg/cm². In the case of an MEA for DMFC, an amount of catalyst support in anode is Pt—Ru black 3 mg/cm² and cathode is Pt black 3 mg/cm². The measurement condition is such that the temperature is at 60° C. In the case of PEMFC, a flow rate of $H_2/O_2$=200 sccm/200 sccm is introduced to each electrode, and in the case of DMFC, a flow rate of 1 M MeOH/$O_2$=1 sccm/200 sccm is introduced.

Table 5 shows the measurement results of the Interfacial Resistance ($\Omega$).

TABLE 5

Interfacial Resistance ($\Omega$)

| Classification | Interfacial Resistance ($\Omega$) | |
| --- | --- | --- |
| | PEMFC | DMFC |
| Example 1 | 0.204 | 0.237 |
| Example 2 | 0.185 | 0.215 |
| Example 3 | 0.173 | 0.201 |
| Example 4 | 0.165 | 0.192 |
| Example 5 | 0.156 | 0.181 |
| Example 6 | 0.176 | 0.205 |
| Example 7 | 0.172 | 0.198 |
| Example 8 | 0.178 | 0.206 |
| Example 9 | 0.193 | 0.226 |
| Example 10 | 0.142 | 0.167 |
| Example 11 | 0.131 | 0.156 |
| Example 12 | 0.157 | 0.183 |
| Example 13 | 0.146 | 0.172 |
| Example 14 | 0.199 | 0.231 |
| Example 15 | 0.196 | 0.228 |
| Example 16 | 0.217 | 0.253 |
| Comparative Example 1 | 0.218 | 0.252 |
| Comparative Example 2 | 0.225 | 0.261 |
| Comparative Example 3 | 0.222 | 0.257 |
| Comparative Example 4 | 0.242 | 0.281 |

As can be seen in Table 5, the interfacial resistance of Examples 1 to 16 decreased significantly compared with Comparative Examples 1 to 4, due to high compatibility with Nafion used as a catalyst binder in the cased of the polymer electrolyte membrane which had been surface-fluorinated by the direct fluorination.

7. Initial Unit Cell Performance

Initial unit cell performance refers to an electrochemical unit performance measured after operating a fuel cell for 48 hours in the same MEA preparation method and under the same measurement conditions as in Table 5.

TABLE 6

Initial Unit Cell Performance (PEMFC at 0.6 V vs. DMFC at 0.4 V)

| Classification | Initial Unit Cell Performance | | | |
| --- | --- | --- | --- | --- |
| | PEMFC | | DMFC | |
| | mA/cm² | mW/cm² | mA/cm² | mW/cm² |
| Example 1 | 165 | 99.0 | 352 | 140.8 |
| Example 2 | 179 | 107.4 | 361 | 144.4 |
| Example 3 | 191 | 114.6 | 369 | 147.6 |
| Example 4 | 199 | 119.4 | 374 | 149.6 |
| Example 5 | 206 | 123.6 | 378 | 151.2 |

TABLE 6-continued

Initial Unit Cell Performance (PEMFC at 0.6 V vs. DMFC at 0.4 V)

| Classification | Initial Unit Cell Performance | | | |
| --- | --- | --- | --- | --- |
| | PEMFC | | DMFC | |
| | mA/cm² | mW/cm² | mA/cm² | mW/cm² |
| Example 6 | 197 | 118.2 | 365 | 146.0 |
| Example 7 | 193 | 115.8 | 362 | 144.8 |
| Example 8 | 195 | 117.0 | 364 | 145.6 |
| Example 9 | 172 | 103.2 | 358 | 143.2 |
| Example 10 | 232 | 139.2 | 382 | 152.8 |
| Example 11 | 245 | 147.0 | 393 | 157.2 |
| Example 12 | 241 | 144.6 | 385 | 154.0 |
| Example 13 | 254 | 152.4 | 391 | 156.4 |
| Example 14 | 123 | 73.8 | 309 | 123.6 |
| Example 15 | 142 | 85.2 | 323 | 129.2 |
| Example 16 | 106 | 63.6 | 288 | 115.2 |
| Comparative Example 1 | 152 | 91.2 | 331 | 132.4 |
| Comparative Example 2 | 110 | 66.0 | 293 | 117.2 |
| Comparative Example 3 | 129 | 77.4 | 314 | 125.5 |
| Comparative Example 4 | 94 | 56.4 | 274 | 109.6 |

In the case of the surface-fluorinated proton conductive polymer electrolyte membrane by direct fluorination, it can be seen that the electrochemical characteristics were improved significantly due to improved proton conductivity and interfacial characteristics. In addition, when the polymer electrolyte membrane is used for DMFC, the electrochemical characteristics are improved even more by adding the improved methanol barrier property to the above-mentioned characteristics.

8. Long Term Operation Characteristic

FIG. 4 is a graph showing a long term operation characteristic of an MEA using the proton exchange polymer membrane obtained from Example 3 and Comparative Example 1. For measurement, the MEA used herein is the MEA tested in Table 6.

The long term fuel cell operation requires a great time and cost. Thus, to monitor the long term characteristic of a fuel cell by reducing the time and cost, the test is carried out under more severe conditions than the actual operation conditions. Here, based on the DMFC on-off operation at 90° C., the long term operation characteristic is evaluated in the condition of 1 M MeOH 3 sccm/air 1,000 sccm and at 200 mA/cm².

As can be seen in FIG. 4, in the case of the polymer electrolyte membrane of Comparative Example 1 whose surface is not fluorinated, the performance deteriorated significantly at approximately 200 hours. On the other hand, the polymer membrane of Example 3 whose surface is fluorinated maintained its performance for about 950 hours due to improved interfacial characteristic between the electrolyte membrane and the catalyst electrodes after the surface-fluorination.

Figure 5:
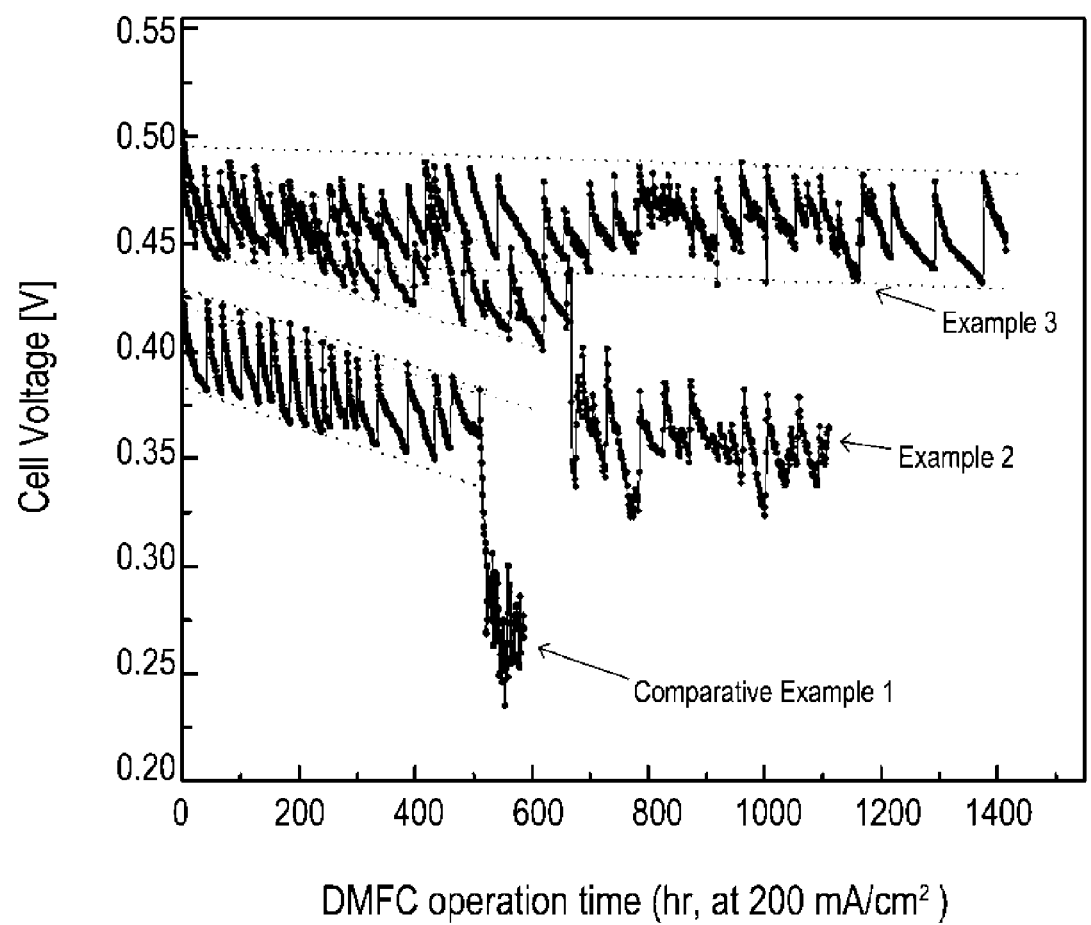
FIG. 5 is a graph showing a long term operation characteristic of an MEA using a proton exchange polymer membrane obtained in Examples 2, 3 and Comparative Example 1.

FIG. 5 is a graph showing a long term operation characteristic of an MEA using the proton exchange polymer membrane obtained from Examples 2, 3 and Comparative Example 1. For measurement, the MEA used herein is the MEA tested in Table 6.

Here, based on the DMFC on-off operation at 90° C., the long term operation characteristic is evaluated in the condition of 1 M MeOH 3 sccm/$O_2$ 1,000 sccm and at 200 mA/cm².

As can be seen in FIG. 5, in the case of the polymer electrolyte membrane of Comparative Example 1 whose surface is not fluorinated, the performance deteriorated significantly at approximately 500 hours showing a rapid decrease of the electrochemical performance. On the other hand, the polymer membrane of Examples 2, 3 whose surface is fluorinated showed a slower decrease of the performance with the improved initial electrochemical performance than the polymer membranes of Comparative Example 1 without the surface fluorination due to improved interfacial characteristic between the electrolyte membrane and the catalyst electrodes after the surface-fluorination.

In addition, in the case of the polymer electrolyte membrane of Example 2 whose surface was fluorinated for 10 minutes, the performance deteriorated significantly at approximately 660 hours. On the other hand, the polymer electrolyte membrane of Example 3 whose surface was fluorinated for 30 minutes maintained its performance over 1,550 hours with decrease rate of 0.24 mV per day.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The proton exchange polymer membrane of the present invention exhibits high dimensional stability, improved proton conductivity and low methanol permeability. Therefore, the proton exchange polymer membrane with excellent electrochemical properties can be used for fuel cells in the various fields of science and technology such as electronics/information communication, aerospace/aviation, environment/energy, and precision machine/chemical engineering.

The invention claimed is:

1. A proton exchange polymer membrane whose surface is treated by direct fluorination using fluorine gas, wherein a degree of surface-fluorination within 100 nm from the interface of the polymer membrane is 1 to 90% with respect to carbon atoms as measured from an X-ray photoelectron spectroscopy.

2. The polymer membrane according to claim 1, wherein the surface is treated using fluorine gas with a concentration of 20 ppm to 1000 ppm.

3. The polymer membrane according to claim 1, wherein the surface is treated for 30 seconds to 24 hours.

4. The polymer membrane according to claim 1, wherein the surface is treated at a temperature ranging from −50° C. to 250° C.

5. The polymer membrane according to claim 1, wherein the surface is treated at a pressure ranging 0.1 atm to 50 atm.

6. The polymer membrane according to claim 1, wherein the fluorine gas is mixed with nitrogen, argon, or helium to obtain a dilute gas mixture.

7. The polymer membrane according to claim 1, wherein the polymer membrane is made of a material having hydrophilic function groups.

8. The polymer membrane according to claim 1, wherein the material of the polymer membrane is selected from the group consisting of polyimide, polysulfone, poly(arylene ether sulfone), poly(arylene ether ketone), poly(arylene sulfone sulfone), polybenzimidazole, polybenzoxazole, polybenzthiazole, poly(ether ether ketone), polyphosphazene, and copolymers thereof.

9. The polymer membrane according to claim 1, wherein the polymer membrane further comprises one inorganic filler selected from the group consisting of $TiO_2$, $SiO_2$, $Al_2O_3$, $ZrO_2$, MgO, CuO, tetraethoxysilane (TEOS), montmorillonite, mordenite, zirconium phosphate (ZrP), phosphotungstic acid, silicotungstic acid, phosphomolybdic acid, and silicomolybdic acid and mixtures thereof.

10. The polymer membrane according to claim 1, wherein the polymer membrane is a proton conductive pure polymer electrolyte membrane, an organic composite membrane, an organic-inorganic polymer composite membrane, or a polymer nanocomposite membrane for fuel cells.

11. A membrane-electrode assembly (MEA) comprising:
   an anode and a cathode positioned opposite from each other; and
   a polymer electrolyte membrane disposed between the anode and the cathode,
   wherein the polymer electrolyte membrane is a proton exchange polymer membrane whose surface is treated by direct fluorination using fluorine gas, wherein a degree of surface fluorination within 100 nm from the interface of the polymer membrane is 1 to 90% with respect to carbon atoms as measured from an X-ray photoelectron spectroscopy.

12. A fuel cell comprising a membrane-electrode assembly (MEA) of claim 11.

13. The fuel cell according to claim 12, wherein the fuel cell is a proton exchange polymer membrane fuel cell (PEMFC) or a direct methanol fuel cell (DMFC).

* * * * *